(12) United States Patent
Froehlich et al.

(10) Patent No.: US 9,091,369 B2
(45) Date of Patent: Jul. 28, 2015

(54) CONTROL DEVICE, AND VALVE ARRANGEMENT HAVING SUCH A CONTROL DEVICE

(75) Inventors: Udo Froehlich, Rothenfels (DE);
Ibrahim Doertoluk, Haibach (DE);
Bernd Schnurr, Lohr-Sendelbach (DE);
Richard Tauber, Heigenbruecken (DE)

(73) Assignee: Robert Bosch GmbH, Stuttgart (DE)

( * ) Notice: Subject to any disclaimer, the term of this patent is extended or adjusted under 35 U.S.C. 154(b) by 1207 days.

(21) Appl. No.: 13/057,972

(22) PCT Filed: Jul. 20, 2009

(86) PCT No.: PCT/EP2009/005248
§ 371 (c)(1),
(2), (4) Date: Apr. 13, 2011

(87) PCT Pub. No.: WO2010/015323
PCT Pub. Date: Feb. 11, 2010

(65) Prior Publication Data
US 2011/0180160 A1 Jul. 28, 2011

(30) Foreign Application Priority Data
Aug. 8, 2008 (DE) .......................... 10 2008 036 980

(51) Int. Cl.
*F16K 31/56* (2006.01)
*F15B 1/02* (2006.01)

(52) U.S. Cl.
CPC ................. *F16K 31/56* (2013.01); *F15B 1/022* (2013.01)

(58) Field of Classification Search
CPC .................................. F16K 31/56; F15B 1/022

USPC ...................... 251/68, 69, 14, 129.03, 66, 27;
137/455, 485, 487.5; 60/403, 404
See application file for complete search history.

(56) References Cited

FOREIGN PATENT DOCUMENTS

| DE | 37 41 261 A1 | 7/1988 |
|---|---|---|
| DE | 101 55 587 C1 | 5/2003 |
| DE | 10 2004 044 962 A1 | 4/2006 |

(Continued)

OTHER PUBLICATIONS

International Search Report corresponding to PCT Application No. PCT/EP2009/005248, mailed Nov. 4, 2009 (German and English language document) (5 pages).

(Continued)

*Primary Examiner* — John K Fristoe, Jr.
*Assistant Examiner* — Andrew J Rost
(74) *Attorney, Agent, or Firm* — Maginot, Moore & Beck LLP

(57) ABSTRACT

A control device has a control drive for operating a valve or some other apparatus, for example an adjustment device for the pitch angle of a wind rotor, by means of a control element. This control drive is associated with an emergency operating device, via which the control element can be reset in the event of a disturbance, essentially independently of the operation of the control drive. This emergency operating device has an energy store, whose stored energy can be released for resetting. The emergency operating device has a piston, on one side of which the energy store acts and on the other side of which a pressure in a pressure area acts, which pressure area can be connected via a switching valve to a tank or the like, in order to release the energy stored in the energy store. In this case, the piston is designed such that it moves the control element in a resetting direction when the pressure in the pressure is relieved.

33 Claims, 9 Drawing Sheets

(56) References Cited

FOREIGN PATENT DOCUMENTS

| DE | 10 2004 045 011 A1 | 4/2006 |
|---|---|---|
| EP | 0 077 596 A1 | 4/1983 |
| EP | 1199501 | 4/2002 |
| EP | 1413810 | 4/2004 |
| EP | 2 321 537 B1 | 5/2011 |
| GB | 819075 | 8/1959 |
| JP | 63-192968 A | 8/1988 |

OTHER PUBLICATIONS

RTK Datasheet 5310-7007, German language document cited in Opposition of corresponding European patent EP2321537, available at least as early as Nov. 28, 2012 (4 pages).

RTK Datasheet 6151-7020, German and English language document cited in Opposition of corresponding European patent EP2321537, available at least as early as Nov. 28, 2012 (9 pages).

ANSI/API Standard 612, Sixth Edition, pp. 36 and 37, English language document cited in Opposition of corresponding European patent EP2321537, Nov. 2005 (2 pages).

Letter from Mr. Laube to Mr. Lehmann (RTK Internal Communication), German language document cited in Opposition of corresponding European patent EP2321537, Sep. 16, 2013 (1 page).

Email from Mr. Lehmann to Mr. Laube (RTK Internal Communication), German language document cited in Opposition of corresponding European patent EP2321537, Aug. 29, 2013 (1 page).

Rexroth Datasheet 27219/01.09, German and English language document cited in Opposition of corresponding European patent EP2321537, available at least as early as Jun. 5, 2013 (4 pages).

Letter to Mr. Damen and Mr. Herren from Mr. Laube (RTK Internal Communication), German language document cited in Opposition of corresponding European patent EP2321537, Jul. 29, 2014 (1 page).

RTK Internal Test Certificates, German language document cited in Opposition of corresponding European patent EP2321537, available at least as early as Aug. 9, 2014 (6 pages).

RTK Order Confirmation, German language document cited in Opposition of corresponding European patent EP2321537, available at least as early as Aug. 9, 2014 (13 pages).

RTK Datasheet 6150-7010, German and English language document cited in Opposition of corresponding European patent EP2321537, available at least as early as Aug. 9, 2014 (7 pages).

RTK Datasheet 6150-7010, German and English language document cited in Opposition of corresponding European patent EP2321537, available at least as early as Aug. 9, 2014 (10 pages).

Letter to Mr. Raasch from Ms. Bocksrocker (RTK Internal Communication), German language document cited in Opposition of corresponding European patent EP2321537, Aug. 12, 2014 (3 pages).

RTK Product Catalog, German language document cited in Opposition of corresponding European patent EP2321537, Dec. 13, 2012 (17 pages).

Invoice, German language document cited in Opposition of corresponding European patent EP2321537, Oct. 13, 2005 (4 pages).

![US 9,091,369 B2]

CONTROL DEVICE, AND VALVE ARRANGEMENT HAVING SUCH A CONTROL DEVICE

This application is a 35 U.S.C. §371 National Stage Application of PCT/EP2009/005248, filed Jul. 20, 2009, which claims the benefit of priority to Serial No. 10 2008 036 980.2, filed Aug. 8, 2008 in Germany, the disclosures of which are incorporated herein by reference in their entirety.

BACKGROUND

The disclosure relates to a control device and to a valve arrangement having the control device.

EP 1 413 810 A1 discloses a control device of the generic type for a turbine valve for controlling the gas or steam supply to a turbine, or a process fitting for controlling a fluid, pitch adjustment for a wind rotor or the like. Control devices such as these normally have a control drive which, in the features of the subject matter of EP 1 413 810 A1, is in the form of an electrical spindle drive. In the case of a gas turbine, an opening cross section of a fitting for adjusting the fuel supply or gas supply, for example, can be adjusted by means of a control device such as this. In an emergency, for example in the event of an electrical power failure or a fault, the fitting—or the pitch angle in the case of a wind rotor—shall be reset, in order to prevent damage to the installation. In the known solution, the spindle drive has an associated toggle lever mechanism for this purpose, which during normal operation, that is to say when the electrical power supply is sufficient, is locked in an extended position, in which a prestressing spring is stressed. This toggle lever acts on a valve body of the fitting (in the case of a gas turbine) or on the control mechanism for setting the pitch angle in the case of a wind rotor. The toggle lever is locked only when the electrical power supply is sufficient; in the event of an electrical power failure, the locking mechanism releases the toggle lever, as a result of which it is moved to its bent position from its extended position via the prestressing spring, and the valve element or the pitch angle adjustment mechanism is reset to its predetermined basic position, corresponding to this adjustment movement.

This solution has the disadvantage that the toggle-lever mechanism requires a considerable amount of physical space and, furthermore, has a relatively complex design, as a result of which the hardware complexity is considerable.

In contrast, the disclosure is based on the object of providing a control device which allows emergency operation with little hardware complexity and with high operational reliability. A control device such as this should also be usable for a valve arrangement, in particular a valve for controlling the steam or gas supply to a turbine or, in general, a process fitting for controlling a process fluid.

This object is achieved by a control device and by a valve arrangement having the features described herein.

SUMMARY

According to the disclosure, the control device has a control drive for operating a valve or some other apparatus, for example an adjustment device for the pitch angle of a wind rotor, by means of a control element. This control drive is associated with an emergency operating device, via which the control element can be reset in the event of a disturbance, essentially independently of the operation of the control drive. This emergency operating device has an energy store, whose stored energy can be released for resetting. According to the disclosure, the emergency operating device has a piston, on one side of which the energy store acts and on the other side of which a pressure in a pressure area acts, which pressure area can be connected via a switching valve to a tank or the like, in order to release the energy stored in the energy store. In this case, the piston is designed such that it moves the control element in a resetting direction when the pressure in the pressure area is relieved.

In this solution, the energy store can therefore be hydraulically prestressed or locked and can be activated by switching the switching valve, in order to reset the control drive.

In order to prevent damage to the control drive and to the components which are moved by it, a restraining or damping device is provided, which is coupled to the control element, in particular via a driver.

The restraining or damping device may have a synchronization or differential cylinder which is mechanically coupled to the control element.

In one exemplary embodiment, this synchronization or differential cylinder has a pressure area which decreases in size during the movement of the control element and is connected via a damping restriction or a restriction gap to another pressure area, which correspondingly becomes larger.

In one exemplary embodiment of the disclosure, the damping device has a restraining cylinder, which is arranged in the pressure medium flow path between the switching valve and the tank and has a restraining piston, which is prestressed by a spring in the closing direction and is acted on by the pressure downstream from the switching valve in the opening direction, and which opens a restriction cross section to the tank after a predetermined travel, with the restraining piston being moved in the closing direction by the control element when the piston is in the end position area.

In one particularly preferred exemplary embodiment, the restraining piston of the restraining cylinder is driven with the control element, in the present case a driver of the spindle drive. After a predetermined restraining piston travel, a restriction cross section is closed, thus correspondingly braking the movement of the control element. The pressure area, which decreases during this process, of the restraining cylinder is connected to the tank via a tank line and a tank valve arranged in it. A pressure area, which becomes larger during emergency operation, of the restraining cylinder is likewise connected to the tank and/or to the other pressure area, which decreases in size.

In one variant of this exemplary embodiment, the switching valve is in the form of a 3/2 position control valve, which opens the pressure medium flow path from the pressure area of the operating cylinder to the tank in its spring-prestressed basic position, and locks this path in its switching position.

In one alternative solution, the damping device has a plunger-type coil, which is operatively connected to the control element and induces a force, counteracting the piston movement, in the end position area.

This damping restriction may, for example, be in the form of a restriction non-return valve, and may be designed to be adjustable.

It is also possible to connect a switching valve in parallel with the damping restriction or the restriction gap, which switching valve is moved electrically or hydraulically to a closed position for damping.

In this case, the switching valve and the changeover valve may form a physical unit which, in particular, is in the form of a 3/2 position control valve.

In one alternative solution, the damping device has a liquid damper which is operatively connected to the control element and guides an electrorheological or magnetorheological liquid along a magnetic field, as a result of the movement of the control element.

This magnetic field is preferably formed by a permanent magnet and is neutralized by an opposing field during normal operation of the control device, that is to say when the electrical power supply is sufficient.

However, in principle, this magnetic field can also be produced only in an emergency by an uninterruptable power supply (UPS). However, solutions such as these do not always comply with the safety regulations for emergency operation.

In order to prevent damage to the control device when the piston moves on to the control element, an impact spring can be provided which is stressed when it moves on to the control element. This impact spring may have a spark-impeding contact surface.

In addition to the damping device described above, the piston may have conventional end position damping.

An auxiliary pump can be provided in order to hydraulically charge the energy store, via which auxiliary pump a sufficient pressure can be built up in said pressure area. This pump may also be formed by the restraining device.

A pressure limiting valve can be provided in the pressure medium flow path between the restraining cylinder and the switching valve, in order to protect the hydraulic components against an excessively high pressure.

In one exemplary embodiment, a bypass line is provided in a part of the pressure medium flow path upstream of the restraining cylinder, via which bypass line a connection to the tank can be made and in which a non-return valve is provided, which opens toward the tank and whose opening pressure is greater than the pressure required to open the restraining valve. This means that this non-return valve remains closed when the restraining valve is carrying out its damping function, and opens only when the pressure required to move the restraining valve is exceeded considerably.

A flow regulating valve (restriction, aperture), which is preferably designed to be movable, can be provided in the pressure medium flow path between the pressure area and the tank, in order to limit the piston speed.

In one particularly simple exemplary embodiment, the control drive is in the form of a spindle drive. However, in principle, pneumatic or hydraulic control drives can also be used.

The energy store for resetting may be a mechanical store, in particular a spring store, a compressed fluid or gas, and/or an elastomer.

In one particularly compact solution, all the major components of the control device are assembled to form a drive unit.

In this case, the control drive, the energy store and the pressure area can be arranged coaxially around a control axis of the control device.

The control device can be designed with a closed, in particular prestressed, hydraulic system, which comprises the pressure area and/or the restraining or damping device.

It is particularly advantageous for the restraining or damping device to be configurable as a pump cylinder for filling the pressure area (internal pump).

The operational reliability of the control device is further improved if the position of the control element is detected by one or more position measurement systems, in particular by linear position measurement systems.

One variant of the disclosure provides means via which the temperature within the housing casing is kept in a predetermined temperature range.

In one exemplary embodiment of the disclosure, means are provided, by means of which the restraining or damping device can be fixed, and which can be overridden by the emergency operating device.

The control device can be designed such that a functional test on the emergency operating device can be carried out during normal operation. By way of example, these means may have a switch which detects a start of the resetting movement of the piston.

In order to increase the operational reliability of gas or steam turbines, two valves can be connected in series with the control devices described above.

Other advantageous developments of the disclosure are the subject matter of further dependent claims.

BRIEF DESCRIPTION OF THE DRAWINGS

Preferred exemplary embodiments of the disclosure will be explained in more detail in the following text with reference to schematic drawings, in which.

DETAILED DESCRIPTION

Figure 1:
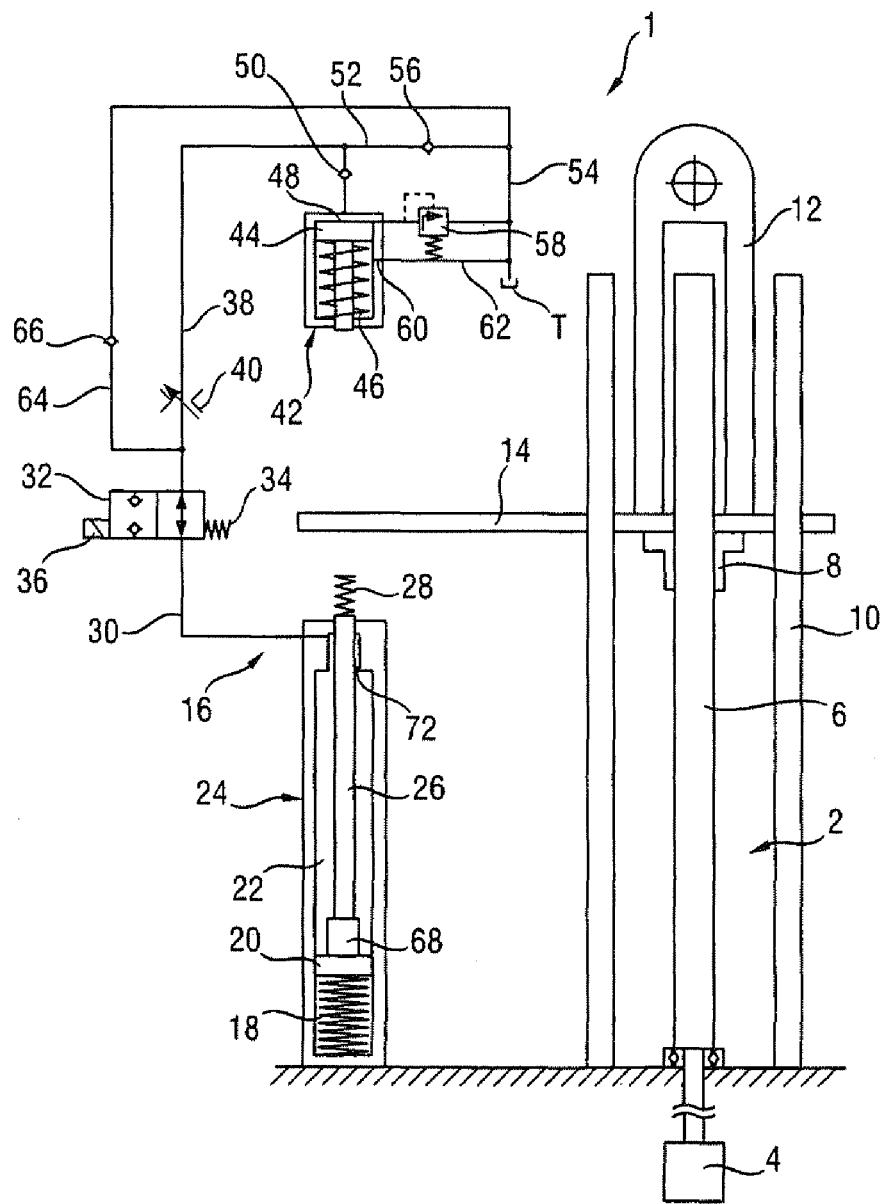
FIG. 1 shows a highly simplified functional diagram of a control device according to the disclosure for a gas turbine valve, during normal operation.

FIG. 1 shows a functional diagram of a control device 1 according to the disclosure for operating a gas or steam turbine valve or a process fitting, via which the volume flow can be adjusted. This control device 1 has a spindle drive 2 with a spindle motor 4 which drives a threaded spindle 6, which itself engages with a spindle nut 8. In the illustrated exemplary embodiment, the spindle 6 is mounted on a frame 10 such that it can rotate. The nut 8 is guided on the spindle 6 such that they rotate together but it can be moved axially, as a result of which the nut 8 carries out a linear movement during a rotary movement of the spindle 6.

The linear movement of the spindle is transmitted to a bracket 12, via which the turbine valve (fitting) can be moved. Furthermore, a driver 14 is mounted on the threaded spindle 6 or the bracket 12, which driver 14 projects radially in the illustration shown in FIG. 1 and is moved linearly in a corresponding manner to the nut 8 and the bracket 12.

The turbine valve can thus be adjusted as a function of the movement of the nut 8, by operation of the spindle motor 4 by means of a control system which will be described in more detail in the following text. In the situation in which this turbine valve is opened, and a certain steam/gas volume flow is thus set, the turbine valve would remain open in the event of an electrical power failure or a fault in the installation, as a result of which it would no longer be possible to control the operation of the turbine. An emergency operating device 16 is provided for an emergency such as this, by means of which the bracket 12 can be reset to a basic position, in which the gas turbine valve is closed. In the solution illustrated in FIG. 1, this resetting is carried out mechanically, in which case no components whatsoever need be operated electrically for the emergency operation. The emergency operating device 16 consists essentially of an energy store, in the present case a spring store 18, which is prestressed via a piston 20. This piston 20 bounds a pressure area 22 of an operating cylinder 24. A piston rod 26 of the piston 20 passes through this, projects out of the operating cylinder 24, and an impact spring 28 is arranged on its projecting end section.

The pressure area 22 is connected via a channel 30 to an electrically operated switching valve 32, which is in the form of a poppet valve. This poppet valve is prestressed to its open position by a prestressing spring 34, and can be moved to its closed position by passing current through a switching magnet 36. The output of the switching valve 32 is connected to a pressure relief line 38, in which a flow valve 40 is provided in order to adjust the pressure medium volume flow via the switching valve 32. The flow valve 40 has a variable cross section, but may also have a constant cross section (aperture or restriction).

This pressure relief line 38 leads to the inlet to a restraining cylinder 42 which, in the illustrated exemplary embodiment, is in the form of a differential cylinder, with the pressure in the pressure relief line 38 being applied to the bottom face of the restraining piston 44. In the illustrated basic position, the restraining piston 44 is prestressed via a spring 46 to a basic position in which a cylinder area 48 at the bottom is minimal. A non-return valve 50 is provided in the pressure medium flow path between the cylinder area 48 and the flow valve 40, preventing pressure medium from flowing back from the cylinder area 48 in the direction of the switching valve 32. A bypass line 52 is tapped off from the pressure relief line 38 in the area between the flow valve 40 and the non-return valve 50, and opens into a tank channel 54. A prestressed non-return valve 56 is provided in this bypass line 52 and opens a pressure medium connection to the tank line 54 if its closing force is exceeded.

The cylinder area 48 is furthermore connected to the tank line 54 via a pressure limiting valve 58, as a result of which the maximum pressure in the cylinder area 48, and therefore also in the pressure relief line 38, is limited via the pressure limiting valve 58.

The restraining piston 44 opens a restriction gap 60 after predetermined travel, which restriction gap is connected via an outlet channel 62 to the tank line 54, which leads to a tank T.

The line section between the flow regulating valve 40 and the position control valve 32 is connected to the tank line 54 via a stressing line 64. A stressing valve 66, in the form of a non-return valve, is arranged in this stressing line 64 and allows a pressure medium to flow from the tank in the direction of the pressure area 22, in order to charge the spring store 18.

During normal operation, the gas turbine valve is moved solely via the spindle drive 2 by operating the electrical spindle motor 4. In this case, current is passed through the switching magnet 36 of the switching valve 32, thus moving it to its leakage-free switch position. The spring store 18 is charged, since there is a pressure in the pressure area 22 which is sufficient to hold the spring store 18 in its prestressed position. In this case, the pressure medium is held in via the switching valve 32. The restraining cylinder 42 is in its illustrated basic position, in which the cylinder area 48 is minimal, and the pressure medium connection to the restriction gap 60 is also closed.

The operating cylinder 24 is designed in a manner known per se with end position damping, in which case a radially widened damping section 68 of the piston rod 26 enters a damping annular area 72 of the operating cylinder 24, thus displacing pressure medium via a restriction gap into the damping angular area 72, and therefore damping the piston movement in the area of the end position. This damping is also additionally assisted by the restraining cylinder 42.

Figure 2:
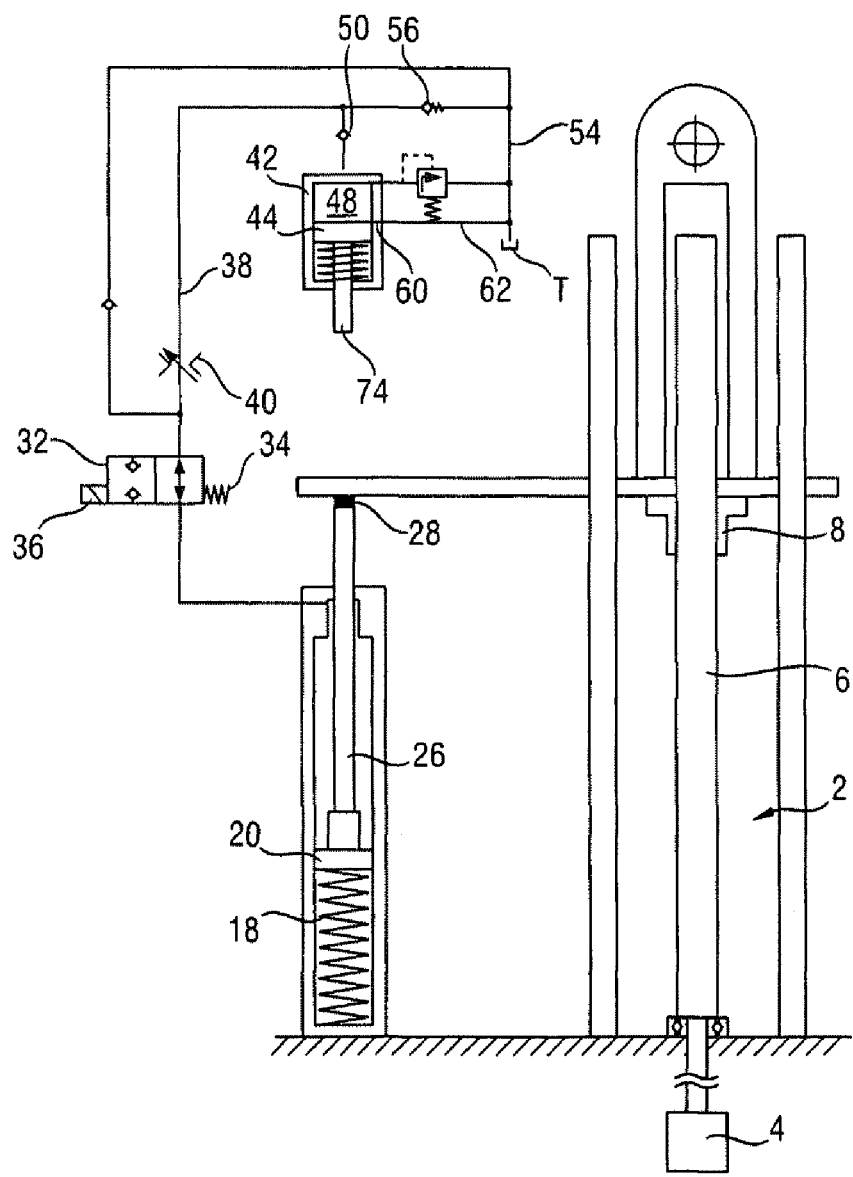
FIG. 2 shows the control device during emergency operation.

In the event of an electrical power failure or a fault, the spindle drive 2 assumes an undefined position. In the event of an emergency such as this, there is therefore no current flow through the operating magnet 36, as a result of which the switching valve 32 is moved to its open position via the prestressing spring 34. This allows the pressure medium to flow out of the pressure area 22 via the open switching valve 32 and the non-return valve 50 to the cylinder area 48, thus resulting in a pressure which is predetermined by the non-return valve 56 in the cylinder area 48. In this case, the piston 44 is pushed against the force of the spring 46 in the axial direction from its illustrated basic position against the force of the spring 46 until the restriction gap 60 is opened, as a result of which the pressure medium can flow away from the pressure area 22 via the open switching valve 32, the flow regulator 40, the non-return valve 50, the cylinder area 48, the restriction gap 60 and the outlet channel 62 to the tank T, thus dissipating the pressure in the pressure area 22. During the process, the piston 20 is moved by the force of the spring store 18 such that pressure medium is forced out of the pressure area 22 and, after travel, the impact spring 28 runs on to the driver 14 (see FIG. 2). In the situation in which the pressure in the cylinder area 48 is greater than the closing force of the prestressed non-return valve 56, the latter opens, as a result of which a portion of the pressure medium volume flow flows away directly to the tank T and the restraining piston 44 remains in its position as illustrated in FIG. 2, in which the restriction gap 60 is open.

Since, initially, the force of the spring store 18 is considerably greater than the force of the impact spring 28, the latter is stressed, and the driver 14 is finally driven. As mentioned initially, this driver 14 is connected to the nut 8 on the spindle drive 2, as a result of which the nut 8, which does not have a self-locking thread, is moved in a corresponding manner in the axial direction, and in the process causes the spindle 6 to rotate. After a further travel of the piston 20, the driver 14 runs on to a restraining piston rod 74, which projects out of the restraining cylinder 42 toward the driver 14. This results in the restraining piston 44 being moved back again in the direction of its basic position, with the restriction gap 60 slowly being closed in the process, as a result of which the pressure medium volume flow from the pressure area 22 to the tank T is restricted, and the movement of the piston 20, and therefore of the driver 14, is correspondingly also slowed down, as a result of which the spindle rotation speed is reduced toward the end of the travel, until the gas turbine valve has reached its closed position, and the spindle drive has been reset to its zero position. In this position, the restriction gap 60 is then completely closed, and the spring store 18 exerts the required spring force.

Figure 3:
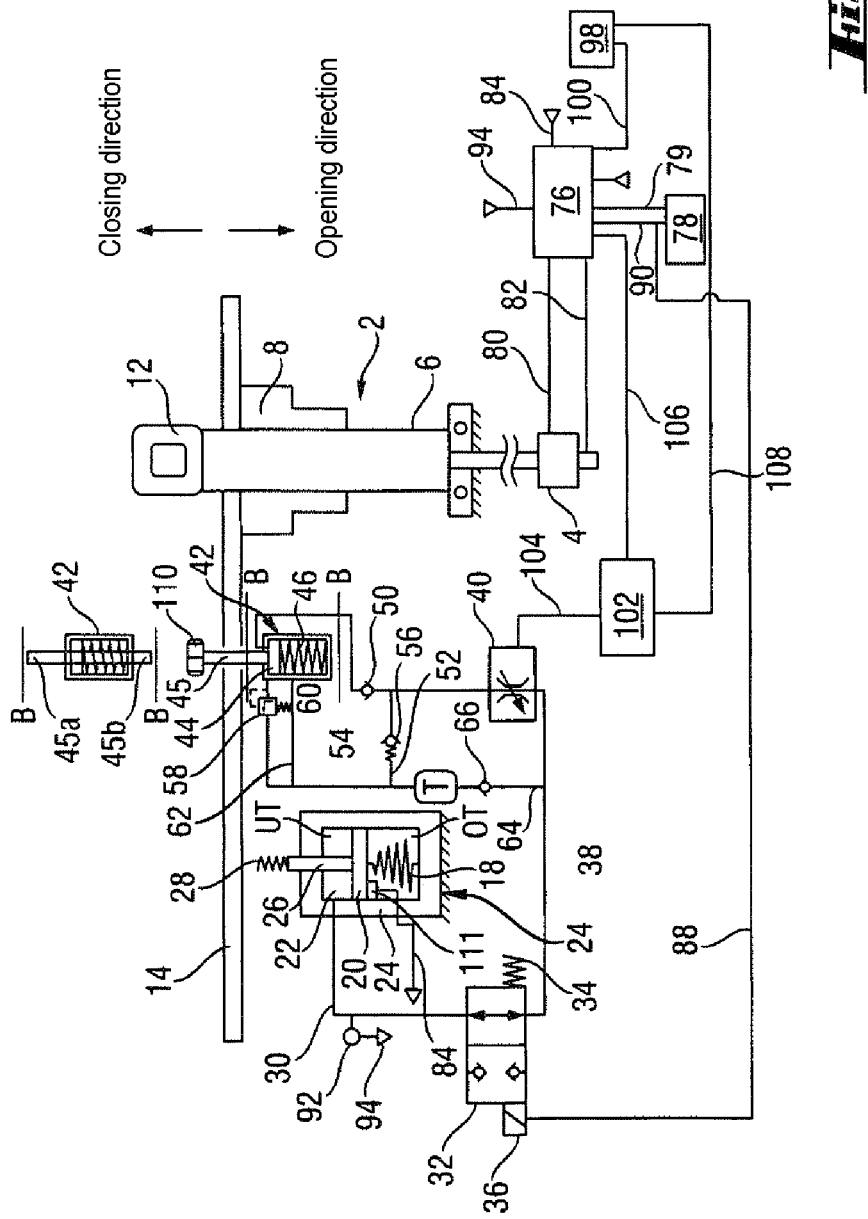
FIG. 3 shows a hydraulic circuit diagram of the control device shown in FIGS. 1 and 2.

The charging process for activation of the emergency operating device 16 will be explained in the following text with reference to FIG. 3. FIG. 3 shows a circuit diagram of the entire control device, which operates on the functional principle explained with reference to FIGS. 1 and 2, with only the function and regulating elements which are not illustrated in FIGS. 1 and 2 being explained in the following text, and with reference being made to the above statements, apart from this. As explained, the process valve or gas or steam turbine valve (or the drive for the pitch angle adjustment) is moved via the electrical spindle drive 2 with the spindle motor 4, the spindle 6, which is fixed in the axial direction and is mounted such that it can rotate, the spindle nut 8 and the bracket 12, which acts on the fitting spindle of the gas or steam turbine valve, in order to move this in the closing direction or in the opening direction (see the arrows in FIG. 3). The spindle motor 4 is operated via a motor regulating device 76. The PLC is connected to the regulating device 76 via a fieldbus or analog interface connection 79. The pressure in the pressure area 22 of the operating cylinder 24 is detected by a pressure monitor 92, and is signaled to the regulating device 76 via a pressure monitoring line 94.

The power supply for this spindle motor 4 is provided via an electrical supply line 80, which is connected to the regulating device 76. The motor feedback is signaled to the regulating device 76 via a feedback signal line 82. A monitoring line 84 is also used to signal whether the spring store 18 is charged (spring stressed).

In the illustrated exemplary embodiment, the control device also has an uninterruptable power supply UPS 98, via which the power supply for the motor and the control voltage for the regulating device 76 can be provided during emergency operation, that is to say in the event of an electrical power failure. The flow regulating valve 40, which can be moved in this exemplary embodiment, is operated via a flow regulating device 102, which is connected to the flow regulating valve 40 via a flow regulating signal line 104. The flow regulating device 102 is itself connected to the regulating device 76 via a signal relay line 106. During emergency operation, the flow regulating device 102 is supplied with the necessary control voltage via a control voltage line 108 from the UPS 98, in order to adjust the pressure medium volume flow, in order to move the spindle drive 2.

In order to charge the spring store 18, that is to say in the case of the illustrated exemplary embodiment, in order to stress the spring pack of the spring store 18, no current is passed through the switching valve 32, as a result of which it is prestressed to its open position by the force of the prestressing spring 34. After the emergency operation as described above, the restraining piston 44 is moved out completely with its restraining piston rod 45, in which case the driver 14 rests on a nut 110, which is attached to the restraining piston rod 45, since—as described above—the driver 14 when in the end position area has moved the restraining piston 44 back again to its spring pre-stressed closed position, in order to damp the resetting of the spindle drive 2. The spindle 6 and therefore the driver 14 are moved in the opening direction by appropriate operation of the spindle motor 4, thus compressing the impact spring 28 and moving the piston 20 back in the OT direction (see FIG. 3), thus charging the spring store 18. This movement of the piston 20 enlarges the pressure area 22, as a result of which pressure medium is sucked back from the tank T via the non-return valve 66, the filling line 64 and the pressure relief line 38 as well as the open switching valve 32.

This process is maintained until either the regulating device 76 generates a motor overtemperature warning, or the spring store 18 reaches its nominal prestress.

In the case of a motor overtemperature, current is passed through the switching valve 32, which is therefore moved to its blocking position, as a result of which the pressure medium is held in the pressure area 22. The spindle motor 4 remains at the current position in the regulation, although no axial movement takes place in the threaded nut 8. The winding temperature of the spindle motor 4 is monitored by the regulating device 76. Once the spindle motor has cooled down, the regulating device 76 signals to the PLC 78, as a result of which the position control valve 32 is once again switched such that no current is passed through it, as a result of which it is reset to its spring-prestressed open position. The spindle motor 4 is then operated until the spring store 18 has the desired prestress applied to it. The spring store 18 is then locked by passing current through the switching valve 32, as a result of which the pressure medium is held in the pressure area 22, and the piston 20 keeps the spring store 18 prestressed. This is monitored via the signal line 84 and a corresponding monitoring switch or switch group 111, and is signaled to the regulating device 76.

As described initially, during normal operation, the current is still passed through the switching valve 32, in which case it is possible to move to any predetermined position in the travel range via the spindle drive 2, in order to adjust the steam or gas turbine valve or the process fitting.

During emergency operation, the PLC (superordinate control) 78 signals an emergency to the regulating device 76 via the fieldbus or analog interface (connection 79) and via the digital input emergency 90. Furthermore, the switching valve 32 is operated via the PLC and the drive line 88. The regulating device 76 then takes the spindle motor 4 out of regulation. If required, the PLC can take the motor directly out of regulation, by means of safety relays.

In order to check the emergency function during operation, the switching valve 32 is briefly switched such that no current is passed through it. The piston 20 must then move correspondingly in the direction UT (FIG. 3). If necessary, the spindle motor 4 can be operated in order to counteract the driver 14 for the piston movement, in order to avoid unnecessarily reducing the load on the spring store 18.

The—slight—movement of the piston 20 is detected by the monitoring switch 111, thus identifying the operation of the emergency drive. If the piston 20 does not move, the emergency function is not ensured—the stressing device then requires appropriate maintenance.

After checking the emergency function, current is once again passed through the switching valve 32, and the spring store 18 is locked. After this, it is then once again necessary to ensure that the spring store 18 is moved back again to its original prestressed position. The spring store 18 can be prestressed by means of an internal pump (the restraining piston is used as pump for this purpose, by suitable switching of the position control valves), or an external pump, or via the spindle motor 4.

Figure 4:
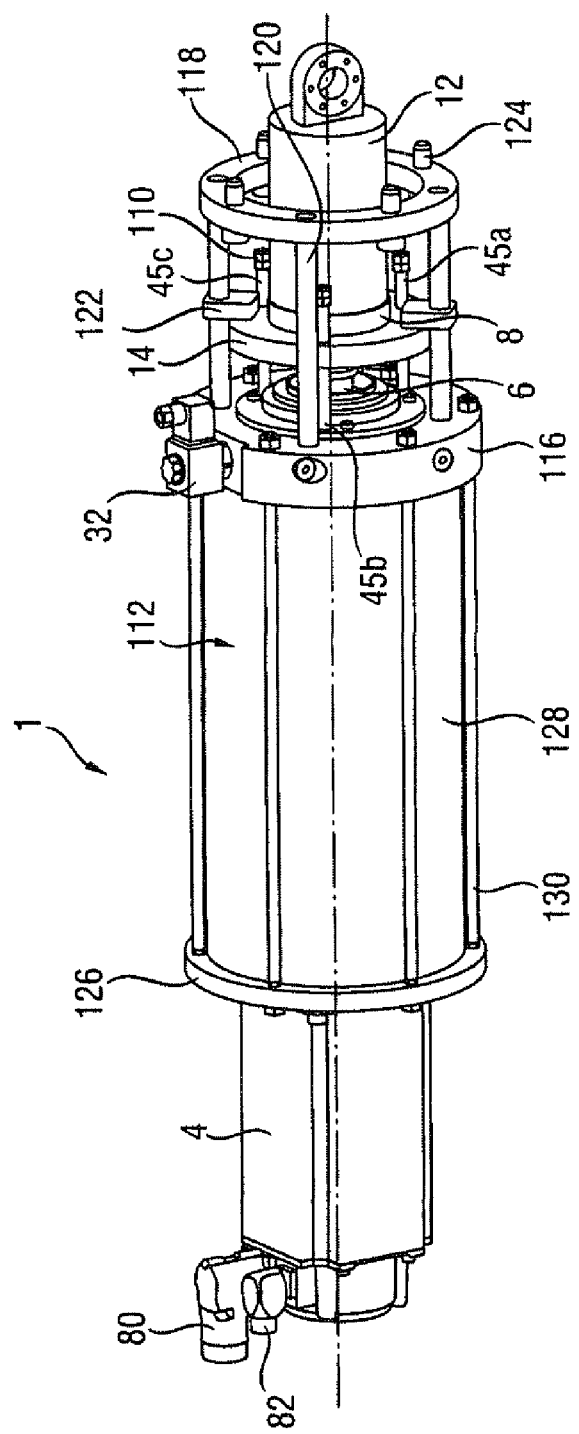
FIG. 4 shows a three-dimensional illustration of a control device as shown in FIG. 3.

FIG. 4 shows one specific exemplary embodiment of the control device 1 according to the disclosure, in which the components described above are essentially assembled to form a unit. The three-dimensional illustration shows the spindle motor 4 with the connection for the supply line 80 and for the feedback signal line 82. The spindle motor 4 is fitted axially to a spindle housing 112 in which—as will be explained in more detail with reference to FIG. 5—the spring store 18, the operating cylinder 24 and the restraining cylinder 42 with the impact spring 28 are accommodated.

The electrically operated switching valve 32, which is in the form of a 2/2 position control valve, is fitted in the radial direction to an end flange 116 of the spindle housing 112, and is used to produce a pressure medium connection—as described above—to the tank T, which is likewise accommodated in the spindle housing 112. The spindle 6, which is driven by the spindle motor 4, passes through the spindle housing 112 and projects out of the end flange 116 in the axial direction. This end section of the spindle 6 has a thread which engages with that of the spindle nut 8 to which, on the one hand, the bracket 12 for operation of the fitting, and on the other hand the driver 14, which is in the form of a disc, are attached. In the illustrated exemplary embodiment, the restraining piston 44, which cannot be seen in FIG. 4, has four piston rods 45a, 45b, 45c and 45d (the latter cannot be seen in FIG. 4) distributed around the circumference, and the stop nuts 110 are screwed to each of their end sections. These piston rods 45a, 45b, 45c, 45d pass through the end flange 116 and through the driver 14, which is in the form of a circular disc, as well, as a result of which the driver 14 runs on to the stop nuts 110, after an axial travel.

A stop ring 118 which clasps the bracket 12 is provided at an axial distance from the end flange 116 and is attached via four longitudinal struts 120, which are distributed around the circumference, to the adjacent end surface of the end flange 116. Two sliding pieces 122, which are arranged diametrically opposite one another and through each of which one of the longitudinal struts passes in a sliding form are attached to that end surface of the driver 14 which faces the stop ring 118, in order to secure the spindle nut 8 such that it cannot rotate. As can also be seen in FIG. 4, the external circumference of the driver 14 runs within the part of the circle which is covered by the longitudinal struts 120. Furthermore, four stop screws 124, which rest on a common part of the circle, are also screwed into the stop ring 118, are offset with respect to the sliding pieces 122, and are used to attach the control device 1 to the gas turbine valve.

The spindle motor 4 is fitted to a motor flange 126 of the spindle housing 112, with a housing casing 128 and a tie rod 130 extending between this and the end flange 116.

As already explained above, the right-hand end section of the spindle 6 in FIG. 4 passes through the end flange 116, and its spindle thread engages with the spindle nut 8, which is itself connected to the driver 14 and to the bracket 12, as a result of which these two elements move axially in the same way as the nut 8 which is mounted such that they rotate together. This rotation protection is provided via the sliding pieces 122, which are connected to the driver 14 and are guided such that they can move along the longitudinal struts 120 to which the stop ring 118 is fitted.

In the exemplary embodiment explained above, the restraining cylinder 42 is in the form of a differential cylinder. As indicated in FIG. 3 above, instead of being a differential cylinder, the restraining cylinder may also be in the form of a synchronization cylinder with a restraining piston 44 which has two piston rods 45a, 45b. In this case, the restraining piston rod 45b passes through the spring area for the spring 46, in which the tank pressure is present.

Figure 5:
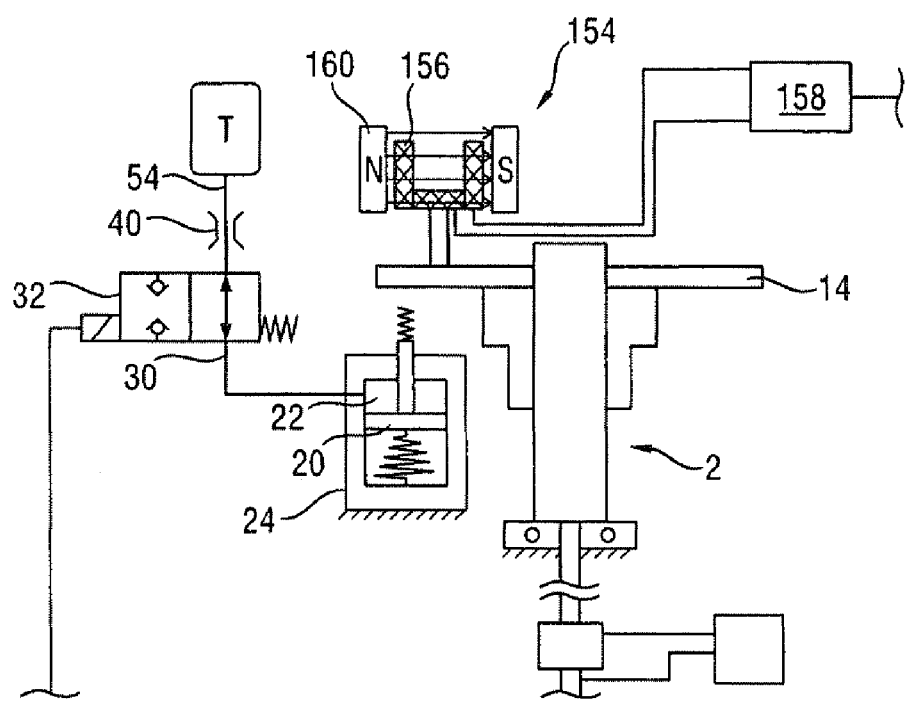
FIG. 5 shows a variant of the control device with a plunger-type coil.

FIG. 5 shows a variant of the control device described above, in which a plunger-type coil system 154 is used instead of the hydraulically acting restraining cylinder 42 as the restraining device. This has a plunger-type coil 156 which is coupled to the driver 14 and through which current is passed via a plunger-type coil regulating device 158, which is supplied from the UPS 98. The plunger-type coil 156 is arranged within a magnetic field that is produced by a permanent magnet 160, such that, when current is passed through the plunger-type coil 156 and the driver 14 is moved, a force which counteracts the driver movement 14 is induced within this magnetic field by corresponding movement of the plunger-type coil 156, this counteracting the outward movement of the piston 20 of the operating device 24, and thus braking it.

In this illustrated exemplary embodiment, the hydraulic part of the control device is correspondingly simplified, since there is no need for hydraulic connection of a hydraulic restraining cylinder 42. As shown in FIG. 5, the outlet of the switching valve 32 is connected to the tank line 54, with the flow regulating valve 40 being arranged therein, in order to limit the pressure medium volume flow displaced from the pressure area 22. This flow regulating valve 40 can also be arranged in the channel 30, which connects the pressure area 22 to the inlet of the switching valve 32. In the exemplary embodiment shown in FIG. 6, the flow regulating valve 40 is in the form of an unadjustable aperture or restriction.

During normal operation of the control device, no current is passed through the plunger-type coil 156, as a result of which no opposing force whatsoever is induced.

The plunger-type coil operates on the functional principle of the Lorentz force. A similar effect can also be achieved by shorting the coil, or via a solenoid.

Figure 6:
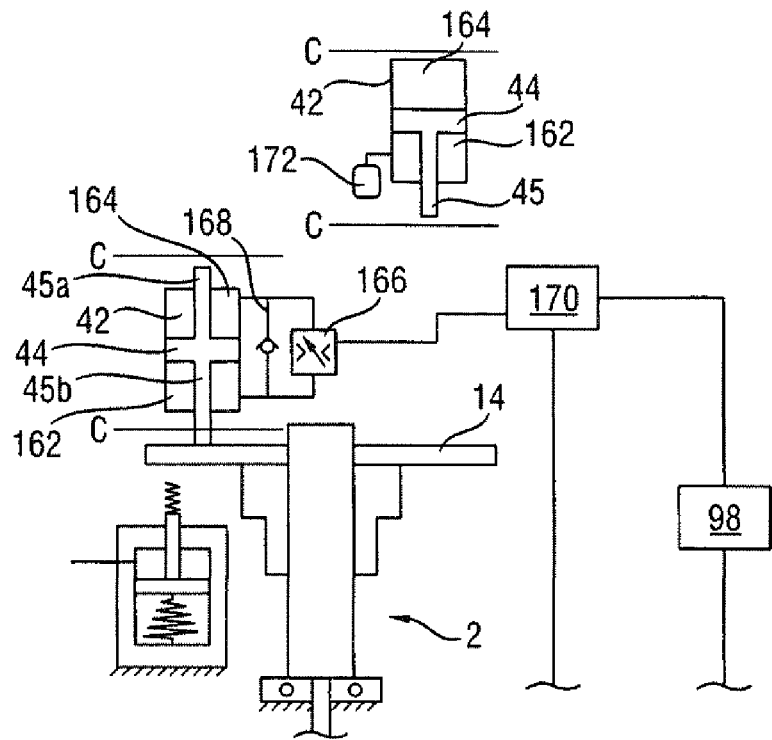
FIG. 6 shows a further exemplary embodiment of the control device with a restraining cylinder and a restriction non-return valve.

In the exemplary embodiment illustrated in FIG. 6, a hydraulic solution is illustrated, in which a restraining cylinder 42 is used as the restraining device, and is designed in a similar manner to the alternative, as shown in FIG. 3, of a synchronization cylinder. In a corresponding manner, the restraining piston 44 has two restraining piston rods 45a, 45b of the same size, with that which is at the bottom in FIG. 6 resting directly on the driver 14 of the spindle drive 2. The restraining piston 44 subdivides the restraining cylinder 42 into two pressure areas 162, 164 with the same cross section, which are connected to one another via a type of restriction non-return valve with a variable restriction cross section 166 and a non-return valve 168 connected in parallel. The restriction cross section 166 can be adjusted via a restriction regulating device 170. The regulating device 176 transmits the current position and/or the speed of the spindle drive 2 to the restriction regulating device 170 via the connection 106. Alternatively, the current position can be supplied to the restriction regulating device 170 via an external linear position sensor (not illustrated), which detects the position of the spindle drive 2 directly. The UPS 98 is responsible for supplying voltage to the restriction regulating device 170 and the measurement system (external sensor and/or regulating device 176) in the event of a voltage failure. In this variant, the restraining piston 44 is connected in a virtually fixed manner to the driver 14.

During normal operation, the restriction cross section 166 is completely open, as a result of which the force acting on the driver 14 via the restraining cylinder 42 is negligible. During emergency operation, the restriction cross section 166 is reduced by the restriction regulating device 170, as a result of which the pressure medium volume flow from the decreasing pressure area 164 into the increasing pressure area 162 is correspondingly restricted, and the driver 14 is correspondingly braked.

In order to improve reliability, a second restriction or aperture can be connected in series upstream of the variable restriction cross section 166, which acts as a flow regulating valve, which second restriction or aperture is bypassed by suitable circuitry during normal operation and ensures a minimum deceleration of the spindle in the event of a fault. The total flow can then be regulated by the variable restriction cross section 166 which acts as a flow regulating valve. An additional flow can then be regulated by means of the restriction regulating device 170.

In an alternative solution, which is likewise shown in FIG. 6, a differential cylinder is used instead of at least one synchronization cylinder, and its restraining piston 44 has a restraining piston rod 45 which is connected to the driver 14. Since the pressure medium volume which is displaced from the pressure area 164 during a movement of the restraining piston 44 is greater than the change in the volume of the annular area 162, a reservoir 172 for pressure medium equalization is associated with this.

In the solutions shown in FIG. 6, the tank T is connected to the outlet of the switching valve 32 in a similar manner to that in the variant shown in FIG. 5.

Figure 7:
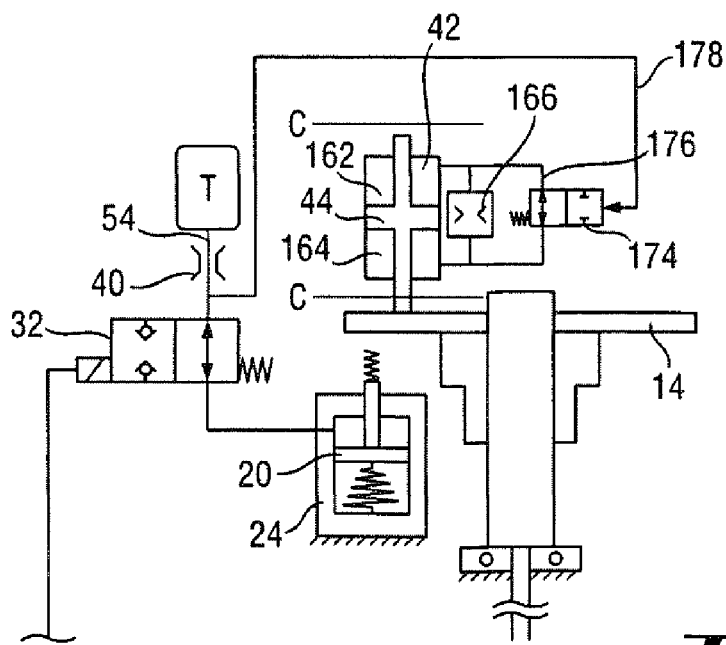
FIG. 7 shows a variant of the exemplary embodiment shown in FIG. 7 with a switching valve instead of a non-return valve.

FIG. 7 shows a variant of the exemplary embodiment described with reference to FIG. 6, in which a restraining device which is driven with the driver 14 is likewise used. The restraining cylinder 42 is once again a synchronization cylinder, with the two pressure areas 162, 164 being connected by a restriction cross section 166 which, in this exemplary embodiment, is not designed to be variable. A hydraulically operated changeover valve 174 is provided in parallel with the restriction cross section 166 and is prestressed by a spring to a through-passage position, in which a bypass line 176 which bypasses the restriction cross section 166 is opened, as a result of which the restriction cross section 166 has no effect, and the restraining piston 44 can therefore move freely. The changeover valve 174 can be switched over by the pressure in a changeover line 178, via which the pressure is tapped off at the outlet of the switching valve 32. This means that, in an emergency and when no current flows through the switching valve 32, the changeover valve 174 is moved to its blocking position by the rising pressure upstream of the flow regulating valve 40, as a result of which the pressure medium which is displaced from the pressure area 162 as it becomes smaller flows away via the restriction cross section 166 to the pressure area 164 as it becomes larger, thus correspondingly damping the movement of the driver 14, and therefore of the piston 20 of the operating cylinder 24.

In a similar way to that in the exemplary embodiment shown in FIG. 6, a differential cylinder with a reservoir 172 for volume equalization can be used instead of the restraining cylinder 42 in the form of a synchronization cylinder.

In the situation in which the changeover valve 174 is intended to switch very quickly, magnetic operation may be used instead of hydraulic operation, by operation via the regulating device 76 or the superordinate PLC 78.

Figure 8:
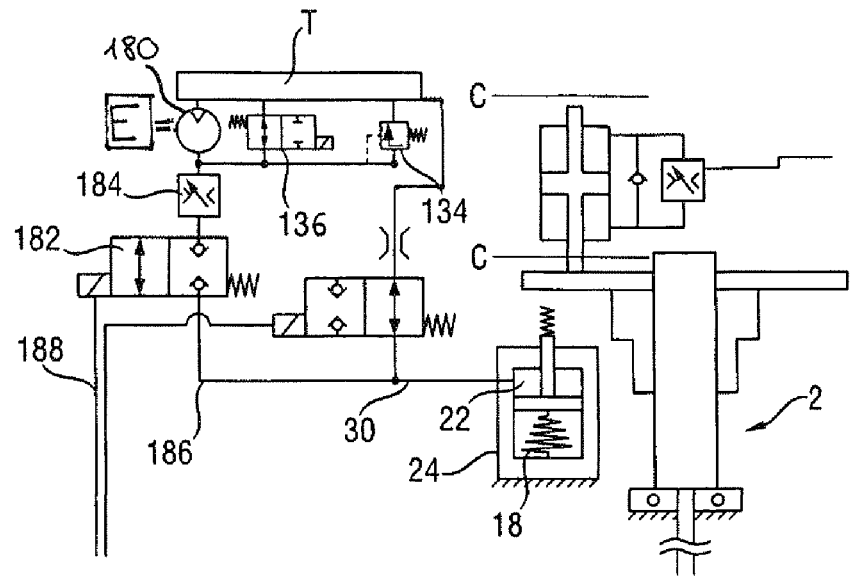
FIG. 8 shows a variant with an auxiliary pump for charging the energy store.

FIG. 8 shows a variant in which the pressure area 22 is not filled after emergency operation by moving back by means of the spindle drive 2, but via an auxiliary pump 180. The suction connection of this auxiliary pump 180 is connected to the tank T. The pressure connection is connected via a pressure line to a pump valve 182 which is in the form of a position control valve, in which case a pump flow regulating valve 184 can be provided in this pressure line.

The outlet of the pump valve 182 is connected via a supply line 186 to the channel 30 which opens in the pressure area 22. The pump valve 182 is driven via a pump signal line 188 which is connected to the regulating device 76 or the superordinate PLC 78.

The pressure at the outlet of the auxiliary pump 180 can be limited via a pressure limiting valve 134. A circulation valve 130 allows circulation without pressure, in order to ensure that the pump is started.

In order to stress the spring store 18, current is passed through the pump valve 182 via the pump signal line 188. At the same time, the pump 180 is operated, such that this pressure medium is sucked out of the tank T and is fed via the open pump valve 182, the supply line 186 and the channel 30 into the pressure area 22, in order to charge the spring store 18.

This solution has the advantage that the regulation of the gas turbine is not influenced by the checking of emergency operation, since the switching valve 32 remains in its blocking position, and the lock on the piston store 18 is therefore maintained during charging.

The charging of the spring store 18 by means of an auxiliary pump 180 can in principle be used for all the described exemplary embodiments.

Figure 9:
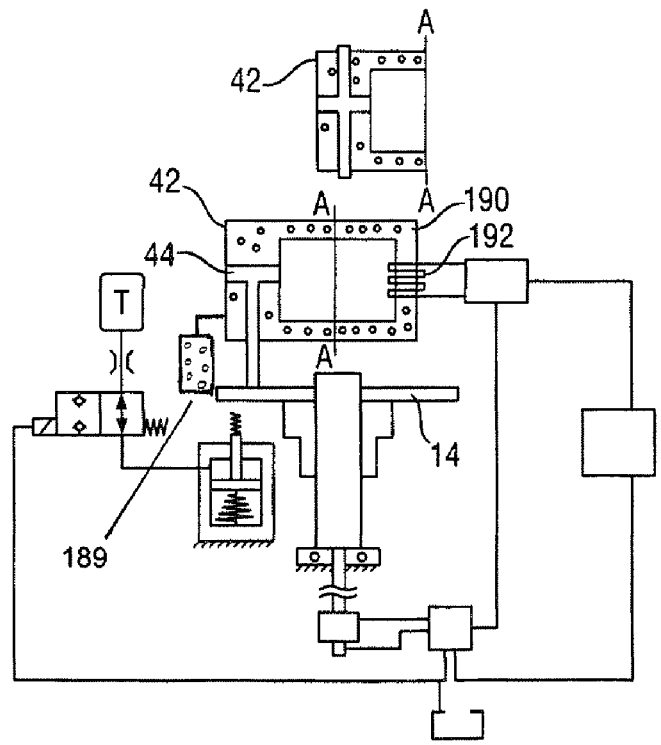
FIG. 9 shows an exemplary embodiment of a control device with an electrorheologically or magnetorheologically acting damper.

FIG. 9 shows an exemplary embodiment of a restraining device which is driven with the driver 14 and is embodied with an electrorheological or magnetorheological liquid. In the illustrated exemplary embodiment, the driver 14 is coupled to a restraining cylinder 42 which is in the form of a liquid damper with a reservoir 189 wherein—as in the case of the exemplary embodiments described above—the restraining piston 44 is also moved with the driver 14. This restraining piston 44 acts as a displacement means, via which the magnetorheological liquid is displaced into a circulation channel 190 which, with the restraining cylinder 42, forms a closed liquid circuit, in which the magnetorheological liquid is arranged. The annular area through which the restraining piston rod 45 passes is connected to the reservoir 189. The magnetorheological liquid in the circulation channel 190 is subjected to a magnetic field, thus impeding the flow in the circulation channel 190, and correspondingly slowing down or damping the piston movement, and therefore the driver movement 14. The permanent-magnet field can be neutralized by means of a neutralization coil 192, as a result of which, during normal operation of the control device 1, there is no significant resistance to the movement of the magnetorheological liquid in the circulation channel 190, since, when current is passed through the neutralization coil 192, it produces an opposing field which cancels out the permanent-magnet field. During emergency operation, the neutralization coil 192 is switched such that no current flows through it, as a result of which the magnetorheological liquid is subject to the permanent-magnet field, and a force which brakes the driver movement 14 is therefore produced.

Figure 10:
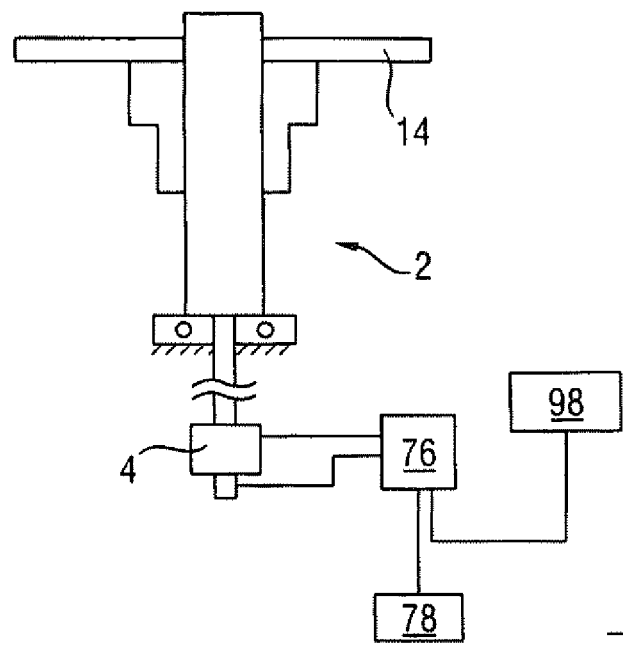
FIG. 10 shows a control device with electrical emergency operation.

Particularly in the field of power stations, the control devices 1 for adjusting the steam or gas supply to a turbine must be designed such that mechanical resetting takes place in the event of emergency operation, independently of an electrical power supply. This means that, in variants such as these, a mechanical store, for example the spring store 18, must always be provided, via which the gas turbine valve can be reset. However, applications also exist in which mechanical solutions such as these are not necessarily specified. In this situation, which is shown in FIG. 10, the resetting of the spindle drive 2 in order to close the gas turbine valve can also be controlled via the UPS 98. Since this UPS 98 provides not only the control voltages but also the power supply for the spindle motor 4 (in some circumstances a 3-phase AC voltage), the spindle motor 4 can carry out the emergency function even in the event of an electrical power failure, by moving the spindle drive 2 back in a regulated manner, in order to close the gas turbine valve. This is therefore a purely electrical solution. The applicant reserves the right to direct a specific independent claim at this solution.

Figure 11:
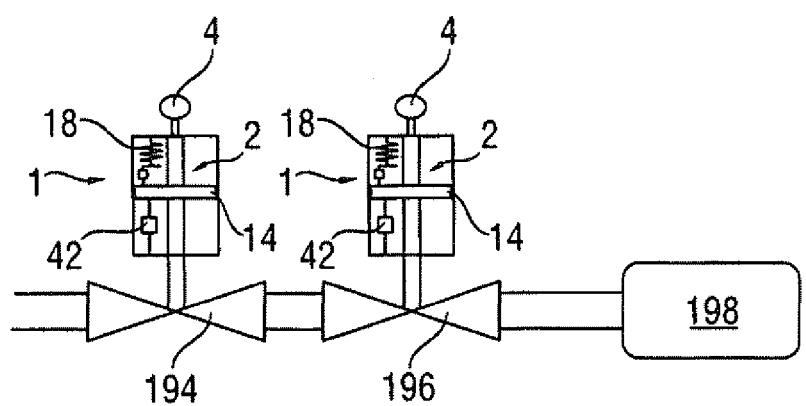
FIG. 11 shows a regulating concept for a gas turbine with increased operational reliability.

As shown in FIG. 11, the operational reliability can also be increased by connecting two gas turbine valves 194, 196 in series in order to control the fuel volume to a gas turbine 198, in which case both gas turbine valves 194, 196 can each be designed with a control device 1 according to the disclosure, with the emergency drive (spring store 18) and the restraining device (restraining cylinder 42) each being indicated schematically. The spindle motor 4 of the spindle drive 2 may in this case optionally be in the form of a servomotor or a controlled drive, for example asynchronous motor. In principle, it is also possible to combine the solution shown in FIG. 10 with one of the solutions shown in FIGS. 1 to 9, as a result of which, for example, mechanical resetting and resetting by means of UPS are then provided. In this case, for example, one of the control devices can carry out the regulation function during normal operation of the gas turbine, while the emergency function is checked in the other control device, without influencing the regulation of the gas turbine.

A redundant system such as this considerably increases the operational reliability of the gas turbine 198.

Figure 12:
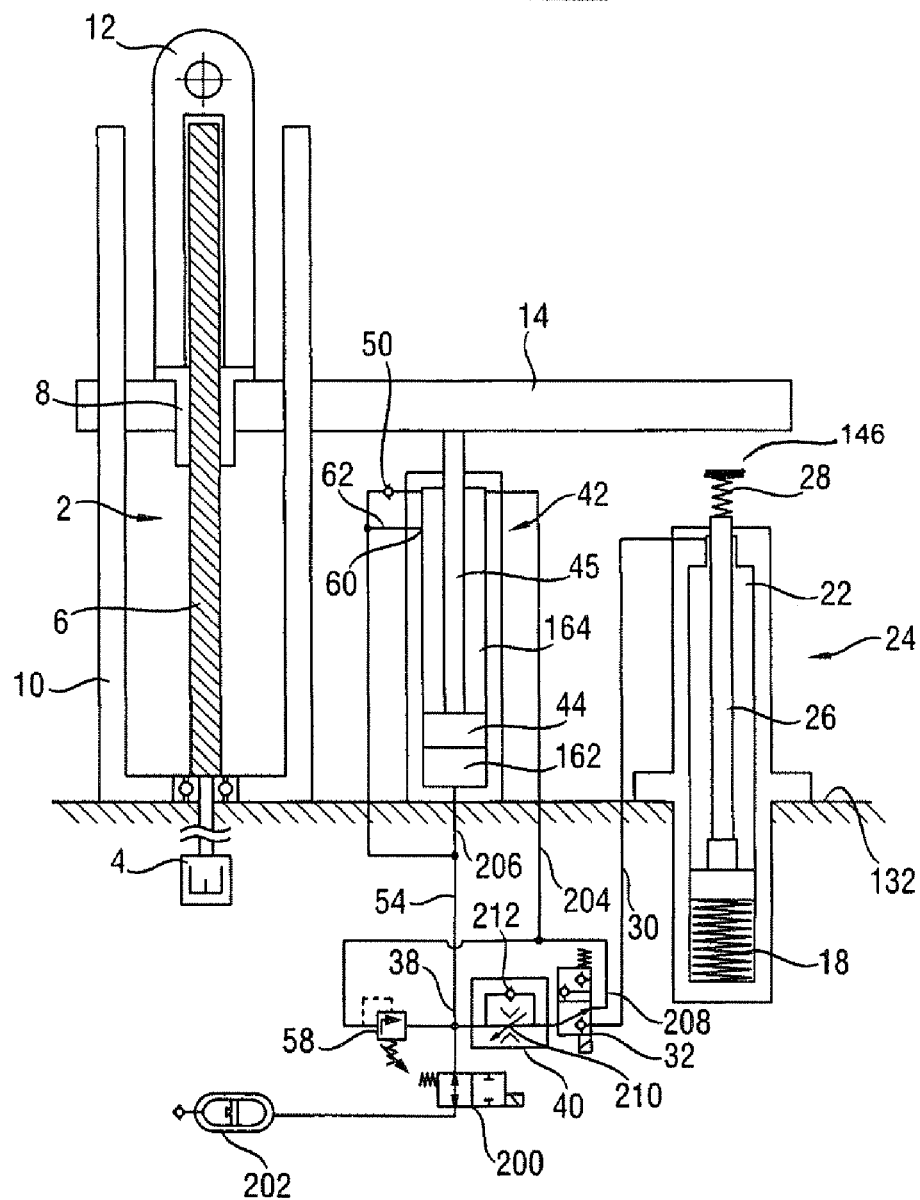
FIG. 12 shows an exemplary embodiment with a driven restraining device.

FIG. 12 shows one preferred exemplary embodiment of the disclosure, in which the restraining piston 45 of the restraining cylinder 42 is driven with the driver 14, in a similar manner to that in the exemplary embodiments shown in FIGS. 6 and 7. The basic design of the spindle drive 2 and of the operating cylinder 24 corresponds to that in the exemplary embodiments described above, as a result of which reference can in this context be made to the above statements. As in the case of all the exemplary embodiments described above, the frame 10 of the spindle drive 2, the operating cylinder 24 and the restraining cylinder 42 as well are supported on a common base 132. In this exemplary embodiment, the restraining cylinder 42 is in the form of a differential cylinder, in which a restraining piston rod 45 of the restraining piston 44 is coupled to the driver 14, as a result of which the restraining piston 44 is driven corresponding to the travel of the nut 8 of the spindle drive 2.

The pressure area of the restraining cylinder 42, which decreases in the closing direction of the gas turbine valve (movement of the nut 8 upwards in FIG. 12), is provided with the reference symbol 164, based on the exemplary embodiment shown in FIG. 6, and the bottom pressure area, which becomes larger in this case, is provided with the reference symbol 162.

The annular pressure area 164 through which the restraining piston rod 45 passes is connected via the outlet channel 62 to the tank line 54. In a similar manner to that in the exemplary embodiment described above, when the pressure area 164 becomes smaller in the end travel area, a restriction gap 60 becomes effective, via which the pressure medium volume flow flowing out of the annular pressure area 164 is restricted.

In the illustrated exemplary embodiment, a tank valve 200 is provided in the tank line 54. This tank valve 200 is in the form of a switching valve and is prestressed to a basic position in which the tank line to the tank is open which, in this exemplary embodiment, is in the form of a hydraulic reservoir 202, which is prestressed to about 5 bar, for example, by gas pressure or a mechanical spring. The tank valve 200 can be moved to a blocking position by passing current through a switching magnet of the tank valve 200, in which blocking position the pressure medium connection to the reservoir 202 is blocked. The annular pressure area 164 is connected via a pressure limiting line 204 and the pressure limiting valve 58 to the tank line 54 in all the travel positions of the restraining piston 44, as a result of which the maximum pressure in the pressure area 164 is limited in accordance with the setting of the pressure limiting valve 58. The bottom pressure area 162 of the restraining cylinder 42 is connected to the tank line 54 via a tank branch line 206. As in the case of the exemplary embodiments described above, the pressure area 22 of the operating cylinder 24 is connected to the tank line 54 via the channel 30, the switching valve 32, the pressure relief line 38 and the flow valve 40.

The switching valve 32 is in this case in the form of a 3/2 position control valve, which is illustrated in its switch position in FIG. 12. In its spring-prestressed basic position, the pressure medium connection is open between the channel 30 and the pressure relief line 38, while it is blocked in the switch position. In this case, the pressure relief line 38 is then connected to a connecting channel 208, which opens into the pressure limiting line 204. When the switching valve 32 is in the basic position, the pressure area 164 is thus in practice connected via the pressure limiting line 204, the connecting channel 208, the switching valve 32, the flow valve 40 and, when the tank valve 200 is closed, via the tank line 54 and the tank branch line 206 to the bottom pressure area 162.

As shown in FIG. 12, the flow valve 40 in this exemplary embodiment is in the form of a restriction non-return valve with a variable restriction 210, and a non-return valve 212 which opens in the direction of the switching valve 32.

In the exemplary embodiment described above, the restraining function is therefore not activated by the driver 14 running on to the restraining piston 44 but by closing the restriction gap 60. In the event of a disturbance, the switching valve 32 which is in the form of a 3/2 position control valve is switched such that no current flows through it, thus resulting in it being reset to its spring-prestressed basic position, in which the pressure medium connection between the channel 30 and the pressure relief line 38 is opened. The pressure medium can then flow away in the manner described above out of the pressure area 22 via the channel 30, the switching valve 32, the flow valve 40 and the tank valve 200, which is likewise spring prestressed to its open position, to the reservoir 202 (tank). The reduction in the pressure in the pressure area 22 reduces the stress on the spring store 18, as a result of which the piston rod 26 moves up in a corresponding manner and, after a comparatively short travel, the impact spring 28 runs on to the driver 14. The impact spring 28 is compressed and, after a further travel, the driver 14 is accelerated, with the piston rod 26 being correspondingly braked. At this stage, the driver 14 and the piston rod 26 are initially at the same speed. The spindle motor 4 and the spindle 6 are in this case accelerated, with the spindle rotation speed rising relatively quickly until the axial movement of the spindle nut 8 is faster than the expansion movement of the piston rod 26. At this stage, the stress on the impact spring 28 is relieved and the driver 14 leads the piston rod 26, as a result of which there is no longer any contact between these two components. In this case, the two pressure areas 164, 162 are both connected to the reservoir 202, as a result of which no pressure can build up (apart from the prestressing pressure of the piston store).

When the driver 14 travels further, and therefore also the restraining piston 44, the restriction of the pressure medium flowing out of the pressure area 164 starts, via the restriction gap 60. In this case, initially, no pressure will yet have been formed in the pressure area 164.

At this time, the driver 14 still slightly leads the piston rod 26 of the operating cylinder 24. A damping pressure is brought on in the pressure area 164 by the restriction in the restriction gap 60, as a result of which the driver movement is braked, and the piston rod 26, which is accelerated further via the spring store 18, runs on to the driver 14 again. The spindle rotation speed is also reduced, corresponding to the braking of the driver 14. When the piston rod 26 runs on to the driver 14, the impact spring 28 is compressed again, and the piston rod 26 is braked. The restraining piston 44 then gradually closes the restriction gap 60, as a result of which the driver 14 is braked as the damping pressure in the pressure area 164 rises further. Shortly before the bracket 12 runs on to a stop 214 on the turbine valve side, the piston rod 26 is braked to a comparatively low speed, by the compression of the impact spring 28 and by the end position damping. The speed of the driver 14 is also correspondingly reduced by the pressure in the cylinder area 164. The bracket 12 then runs on to the stop 214 on the valve side, as a result of which the driver 14 is braked abruptly and in this case it still continues to oscillate somewhat, with this oscillation being made possible by the spring pack 18 and the impact spring 28. When the bracket 12 runs on to the stop 214, the gas turbine valve is then closed, and is also held in this position.

One special feature of the exemplary embodiment described above is that the spring store 18 can be charged with the aid of the restraining cylinder 42. This pump function is referred to as an internal pump function and, after initiation of the emergency function, takes place as follows:

There is still no current flowing through the switching valve 32 and the tank valve 200, as a result of which both valves are prestressed to a position in which the pressure medium connection between the pressure area 22 and the reservoir 202 is open. The completely extended restraining piston 44 is then moved downward through a predetermined travel by operation of the spindle motor 4, thus enlarging the annular pressure area 164 and correspondingly reducing the size of the bottom pressure area 162. The pressure medium displaced therefrom can flow via the tank branch line 206 and the tank line 54 to the annular pressure area 164, as a result of which this is filled with pressure medium. The excess amount is forced out of the pressure area 162 via the tank valve 200 to the reservoir 202. The movement just described also results in the piston rod 26 of the operating cylinder 24 being moved downwards by the influence of the force from the driver 14, via the impact spring 28, with the spring store 18 being stressed. Pressure medium flows into the pressure area 22, which in this case is becoming larger, from the reservoir 202 via the tank valve 200, the non-return valve 212, the switching valve 32 and the channel 30. After the predetermined travel of the restraining piston 44, current is passed through the switching valve 32 and it is switched to its position as illustrated in FIG. 12, in which the pressure area 22 is blocked without any leakage. The restraining piston 44 is then extended again by operation of the spindle drive 2 via the driver 14, as a result of which the bottom pressure area 162 is correspondingly enlarged, and is filled with pressure medium from the reservoir 202 via the tank valve 200, which is still open. The pressure medium is forced out of the pressure area 164 as it becomes smaller, via the pressure limiting line 204 and the switching valve 32. The tank valve 200 is then switched to its blocking position, as a result of which the pressure medium connection to the reservoir 202 is blocked. The switching valve 32 is then switched such that no current flows through it, as a result of which the pressure in the pressure area 22 acts throughout the entire hydraulic system (except for the separated reservoir 202). There is therefore no significant movement of the driver 14 or of the piston rod 26.

The spindle drive 2 is then operated, and the driver 14 is moved downward through a predetermined travel, as a result of which the restraining piston 44 is moved in in a corresponding manner, and pressure medium is displaced (pump effect) from the bottom pressure area 162 and is fed into the pressure area 22, thus stressing the spring store 18.

In the next step, current is once again passed through the switching valve 32, and the pressure medium connection to the pressure area 22 is therefore blocked. The tank valve 200 is switched so that no current flows through it, as a result of which the pressure medium connection to the reservoir 202 is opened, and both pressure areas 164, 162 are connected to the reservoir 202, and are thus at the same pressure as that in the reservoir 202.

The pump cycle then begins again from the start, until the spring store 18 is completely stressed. The applicant reserves the right to direct a specific independent claim at the exemplary embodiment as shown in FIG. 12, in particular the dual function of the restraining cylinder 42 as a damping device and as a pump, claiming only the components which are required for operation.

In principle, all drives and restraining devices may be hydraulic or pneumatic. The regulating device for the restraining device is only optional, since all the envisaged systems in principle operate even without this regulating device (flow regulating device 102).

Without a flow regulating device 102 such as this, the flow regulating valve 40 is set to a constant value, as a result of which the resetting movement of the spindle drive 2 can take place in a controlled manner, even in the worst case.

As already stated, all the cylinders may be in the form of synchronization, plunger or differential cylinders (the latter with a reservoir). The flow valve 40 may alternatively also be provided between the changeover valve 32 and the pressure area 22.

The abovementioned UPS 98 is only optionally provided. All variants apart from the exemplary embodiment shown in FIG. 10 operate even without this UPS 98. Apart from this exemplary embodiment, the UPS 98 is used primarily to provide the control voltage for the flow regulating device 102. The sensor signals from the spindle motor 4 are supplied thereto (alternatively, a load sensor signal can also be used, which directly also detects the linear movement of the driver). A speed regulator is implemented in the regulating device, calculates a manipulated variable signal and therefore, for example, adjusts the restriction device 40 (in this case implemented in the form of a flow regulating valve) such that the driver moves at a constant speed, even during emergency operation (driven by the spring store 18). If the motor sensor signals are used, the UPS 98 must also provide the control voltage for the regulating device 76. In the situation in which the UPS 98 fails, the emergency function can nevertheless be carried out by ensuring that a damping path is always present (for example by positioning a nozzle upstream, which, although it does not regulate the speed, reduces this to a minimum, however, as a result of which the mechanism is not damaged). In the exemplary embodiment shown in FIG. 11, the UPS 98 provides not only the control voltage but also the power supply, and can therefore be used only for less safety-critical installations.

A control device is disclosed for an apparatus, for example a gas or steam turbine valve or in general a process fitting for controlling a process fluid, having an electrical control drive and an emergency operating device for resetting the apparatus by means of a control element in the event of a disturbance. The emergency operating device has an energy store whose stored energy is used to reset the control element. According to the disclosure, the energy store has an associated piston to which the pressure in a pressure area is applied in order to charge the energy store and which pressure area can be connected via a switching valve to a tank or the like, as a result of which the piston is moved by the discharging energy store. The piston interacts with the control element of the control drive, in order to move this in the resetting direction.

LIST OF REFERENCE SYMBOLS

1 Control device
2 Spindle drive

4 Spindle motor
6 Spindle
8 Nut
10 Frame
12 Bracket
14 Driver
16 Emergency operating device
18 Spring store
20 Piston
22 Pressure area
24 Operating cylinder
26 Piston rod
28 Impact spring
30 Channel
32 Switching valve
34 Prestressing spring
36 Switching magnet
38 Pressure relief line
40 Flow valve
42 Restraining cylinder
44 Restraining piston
45 Restraining piston rod
46 Spring
48 Cylinder area
50 Non-return valve
52 Bypass line
54 Tank line
56 Prestressed non-return valve
58 Pressure limiting valve
60 Restriction gap
62 Outlet channel
64 Filling line
66 Non-return valve
68 Damping section
72 Damping annular area
74 Restraining piston rod
76 Regulating device
78 PLC
79 Connection
80 Supply line
82 Feedback signal line
84 Signal line
88 Drive line
90 Digital input, emergency
92 Pressure monitor
94 Pressure monitoring line
98 UPS
100 Lines
102 Flow regulating device
104 Flow regulating signal line
106 Signal relay line
108 Control voltage line
110 Stop nut
111 Monitoring switch
112 Spindle housing
116 End flange
118 Stop ring
120 Longitudinal strut
122 Sliding piece
124 Stop screw
126 Motor flange
128 Housing casing
130 Tie rod
132 Base
134 Pressure limiting valve
136 Circulation valve
146 Contact surface
154 Plunger-type coil system
156 Plunger-type coil
158 Plunger-type coil regulating device
160 Permanent magnet
162 Pressure area
164 Pressure area
166 Restriction cross section
168 Non-return valve
170 Restriction regulating device
172 Reservoir
174 Changeover valve
176 Bypass line
178 Changeover line
180 Auxiliary pump
182 Pump valve
184 Pump flow regulating valve
186 Supply line
188 Pump signal line
189 Reservoir
190 Circulation channel
192 Neutralization coil
194 Gas turbine valve
196 Gas turbine valve
198 Gas turbine
200 Tank valve
202 Reservoir
204 Pressure limiting line
206 Tank branch line
208 Connecting channel
210 Adjustable restriction
212 Non-return valve
214 Valve-side stop

The invention claimed is:

1. A control device for a fluid apparatus, comprising:
a control drive including a control element configured to operate the fluid apparatus; and
an emergency operating device configured to reset the control element essentially independently of the control drive in the event of a disturbance, the emergency operating device including an energy storage device configured to selectively release stored energy to reset the control element,
wherein the energy storage device interacts with a first piston,
wherein the first piston bounds a liquid-filled pressure area,
wherein a switching valve is configured to selectively connect the liquid-filled pressure area to a tank device,
wherein the first piston is arranged to move the control element in a resetting direction when a pressure in the liquid-filled pressure area is relieved, and
wherein the fluid apparatus is one of a valve configured to control the steam or gas supply to a turbine and a process fitting configured to control a process fluid.

2. The control device as claimed in claim 1, wherein a driver couples one of a restraining device and a damping device to the control element.

3. The control device as claimed in claim 2, wherein one of the restraining device and the damping device includes one of a synchronization cylinder mechanically coupled to the control element and a differential cylinder mechanically coupled to the control element.

4. The control device as claimed in claim 3, wherein:
the damping device includes a restraining cylinder,
the restraining cylinder includes a restraining piston coupled to the control element, the restraining piston is configured to close a restriction cross section after a travel during an emergency operation, and a tank line and a tank valve connect a decreasing pressure area of the restraining cylinder to a reservoir.

5. The control device as claimed in claim 4, wherein the switching valve is a 3/2 position control valve configured (i) to open a pressure medium flow path from the decreasing pressure area to the reservoir when positioned in a spring-prestressed basic position, and (ii) to lock the pressure medium flow path from the decreasing pressure area to the reservoir when positioned in a switching position.

6. The control device as claimed in claim 4, further comprising:
a pressure limiting valve configured to limit a pressure in a pressure medium flow path between the switching valve and the restraining cylinder.

7. The control device as claimed in claim 4, further comprising:
a bypass line between a part located upstream of the restraining cylinder and the tank device,
wherein a non-return valve configured to open toward the tank device is provided in the bypass line, and an opening pressure of the non-return valve is greater than a pressure required to move the restraining cylinder.

8. The control device as claimed in claim 3, wherein:
one of the synchronization cylinder and the differential cylinder includes a first pressure area,
the first pressure area decreases during the movement of the control element,
the first pressure area is connected to a second pressure area, and
one of a damping restriction and a restriction gap causes the second pressure area to increase during the movement of the control element.

9. The control device as claimed in claim 8, wherein:
the damping device defines a restraining cylinder arranged in a pressure medium flow path between the switching valve and the tank device,
a restraining piston is associated with the restraining cylinder and is prestressed in a closing direction by a spring,
a pressure downstream from the switching valve acts on the restraining piston in an opening direction to open a restriction cross section to the tank device after a predetermined travel, and
the restraining piston is configured for movement in the closing direction by the control element when the restraining piston is in an end position area.

10. The control device as claimed in claim 8, wherein one of the damping restriction and the restriction gap is connected in parallel with a changeover valve, and the changeover valve is configured to move to a closed position for damping.

11. The control device as claimed in claim 10, wherein the changeover valve and the switching valve form a physical unit and the physical unit is a 3/2 position control switching valve.

12. The control device as claimed in claim 8, wherein the damping restriction is a restriction non-return valve including a movable restriction cross section.

13. The control device as claimed in claim 2, wherein the damping device is a plunger-type coil system including a plunger-type coil operatively connected to the control element, and the control element is configured to move the plunger-type coil to produce a damping force, which acts against movement of the first piston in the resetting direction.

14. The control device as claimed in claim 2, wherein:
the damping device is a liquid damper operatively connected to the control element, and
the liquid damper is configured to move one of a magnetorheological liquid and an electroheological liquid in a circulation channel on the basis of the movement of the control element, and
the electrorheological liquid or the magnetorheological liquid is guided along a magnetic field.

15. The control device as claimed in claim 14, wherein the magnetic field is provided by one of (i) a permanent magnetic field configured to be neutralized during a normal operation by an opposing field, and (ii) an uninterruptable power supply (UPS) during an emergency operation.

16. The control device as claimed claim 2, wherein:
a closed prestressed hydraulic system is provided, and
the hydraulic system comprises at least one of the liquid-filled pressure area, the restraining device, and the damping device.

17. The control device as claimed in claim 2, wherein one of the restraining device and the damping device is configured as a pump cylinder for filling the liquid-filled pressure area.

18. The control device as claimed in claim 2, further comprising:
a fixing valve configured to fix the restraining device or damping device,
wherein the emergency operating device is configured to override the fixing of the fixing valve.

19. The control device as claimed in claim 1, wherein:
the first piston includes an impact spring on a control element side of the first piston, and
the impact spring is configured to be stressed when it moves on to the control element.

20. The control device as claimed in claim 19, wherein the impact spring includes a spark-impeding contact surface.

21. The control device as claimed in claim 1, wherein the first piston has associated end position damping, in which an end section of the first piston enters a damping annular area and displaces a pressure medium.

22. The control device as claimed in claim 1, further comprising:
an auxiliary pump configured to apply pressure to the liquid-filled pressure area.

23. The control device as claimed in claim 1, further comprising:
a flow valve provided in a pressure medium flow path between the pressure area and the tank device,
wherein the flow valve is a restriction device.

24. The control device as claimed in claim 1, wherein the control drive is an electrically driven spindle drive.

25. The control device as claimed in claim 1, wherein the control drive acts pneumatically or hydraulically.

26. The control device as claimed in claim 1, wherein the energy storage device is one or more of a spring, a compressed fluid or gas, and an elastomer.

27. The control device as claimed in claim 1, wherein at least the control drive and the emergency operating device are combined to form a drive unit.

28. The control device as claimed in claim 27, wherein the control drive, the energy storage device and the liquid-filled pressure area are arranged coaxially around a control axis of the control device.

29. The control device as claimed claim 1, further comprising:
one or more position measurement systems configured to detect a position of the control element.

30. The control device as claimed in claim 1, further comprising:
- a housing casing; and
- a temperature control device configured to maintain a temperature within the housing casing in a predetermined temperature range.

31. The control device as claimed in claim 1, further comprising:
- a detection device configured to carry out a functional test on the emergency operating device during normal operation,
- wherein the detection device includes a switch configured to detect a start of a resetting movement of the first piston.

32. A valve arrangement, comprising:
- at least one control device comprising
    - a control drive including a control element configured to operate the fluid apparatus; and
    - an emergency operating device configured to reset the control element essentially independently of the control drive in the event of a disturbance, the emergency operating device including an energy storage device configured to selectively release stored energy to reset the control element,
- wherein the energy storage device interacts with a first piston,
- wherein the first piston bounds a liquid-filled pressure area,
- wherein a switching valve is configured to selectively connect the liquid-filled pressure area to a tank device,
- wherein the first piston is arranged to move the control element in a resetting direction when a pressure in the liquid-filled pressure area is relieved, and
- wherein the valve arrangement is one of a gas turbine valve arrangement and a steam turbine valve arrangement.

33. The valve arrangement as claimed in claim 32, further comprising:
- at least two valve members connected in series,
- wherein each of the valve members includes a control device of the at least one control device.

* * * * *